United States Patent [19]

McMurtry

[11] Patent Number: 5,353,514

[45] Date of Patent: * Oct. 11, 1994

[54] TOUCH PROBE

[75] Inventor: David R. McMurtry, Wotton-Under-Edge, United Kingdom

[73] Assignee: Renishaw, plc, Gloucestershire, United Kingdom

[ * ] Notice: The portion of the term of this patent subsequent to Sep. 15, 2009 has been disclaimed.

[21] Appl. No.: 111,601

[22] Filed: Aug. 25, 1993

Related U.S. Application Data

[63] Continuation of Ser. No. 944,341, Sep. 14, 1992, Pat. No. 5,253,428, which is a continuation of Ser. No. 660,048, Feb. 25, 1991, Pat. No. 5,146,691.

[30] Foreign Application Priority Data

Feb. 23, 1990 [GB] United Kingdom ................. 9004117

[51] Int. Cl.$^5$ ............................................ G01B 5/20
[52] U.S. Cl. ....................................... 33/559; 33/558; 33/561
[58] Field of Search ................. 33/556, 558, 559, 560, 33/561

[56] References Cited

U.S. PATENT DOCUMENTS

| | | |
|---|---|---|
| 2,470,244 | 5/1949 | Fryklund . |
| 3,541,924 | 11/1970 | Gambin . |
| 3,571,934 | 3/1971 | Buck, Sr. . |
| 4,136,458 | 1/1979 | Bell et al. . |
| 4,153,998 | 5/1979 | McMurtry . |
| 4,177,568 | 12/1979 | Werner et al. . |
| 4,288,925 | 9/1981 | McMurtry . |
| 4,360,973 | 11/1982 | McMurtry . |
| 4,443,946 | 4/1984 | McMurtry . |
| 4,451,987 | 6/1984 | Cusack . |
| 4,462,162 | 7/1984 | McMurtry ............................ 33/561 |
| 4,473,955 | 10/1984 | McMurtry . |
| 4,477,976 | 10/1984 | Suzuki . |
| 4,523,382 | 6/1985 | Werner et al. . |
| 4,549,356 | 10/1985 | Ernst ..................... 33/356 |
| 4,577,416 | 3/1986 | Franz . |
| 4,581,826 | 4/1986 | Ernst . |
| 4,661,037 | 4/1987 | Sugino et al. ........... 33/559 |
| 4,763,421 | 8/1988 | Feichtinger . |
| 4,897,929 | 2/1990 | Ernst et al. . |
| 4,916,825 | 4/1990 | Breyer ................... 33/559 |
| 4,941,266 | 7/1990 | Bissegger et al. . |
| 5,146,691 | 9/1992 | McMurtry ........................ 33/559 |
| 5,253,428 | 10/1993 | McMurtry ........................ 33/559 |

FOREIGN PATENT DOCUMENTS

| | | |
|---|---|---|
| 0068899 | 1/1983 | European Pat. Off. . |
| 0088596 | 9/1983 | European Pat. Off. . |
| 0110192 | 6/1984 | European Pat. Off. . |
| 0242747 | 10/1987 | European Pat. Off. . |
| 0269789 | 6/1988 | European Pat. Off. . |
| 3246252 | 6/1984 | Fed. Rep. of Germany . |
| 3715698 | 12/1988 | Fed. Rep. of Germany . |
| 2366542 | 4/1978 | France . |
| 2375580 | 7/1978 | France . |
| 2527765 | 12/1983 | France . |
| 58-66801 | 4/1983 | Japan . |
| 64-35202 | 2/1989 | Japan . |
| 86/03829 | 7/1986 | PCT Int'l Appl. . |
| WO90/00717 | 1/1990 | PCT Int'l Appl. . |
| WO91/10887 | 7/1991 | PCT Int'l Appl. . |
| 460426 | 8/1975 | U.S.S.R. . |
| 1237813 | 6/1971 | United Kingdom . |
| 1506659 | 4/1978 | United Kingdom . |
| 2047133 | 11/1980 | United Kingdom . |
| 1593682 | 7/1981 | United Kingdom . |
| 1599758 | 10/1981 | United Kingdom . |
| 2205650 | 12/1988 | United Kingdom . |

OTHER PUBLICATIONS

"A Numerically Controlled Measuring Machine," H. J. Elton et al., Feb. 1963, Control, pp. 71–75.

Primary Examiner—Thomas B. Will
Attorney, Agent, or Firm—Oliff & Berridge

[57] ABSTRACT

A touch trigger probe for a coordinate measuring machine or machine tool has a stylus (14), which is biased into a rest position. The stylus has two independent supports, provided within a housing (10). In the embodiment of FIG. 1, the first support comprises a skirt (18) of a stylus holder (12), which is axially constrained on a surface (20) of the housing (10). The second support comprises a kinematic arrangement of cylinders (34) and balls (36), together with a planar spring (30), which together provide lateral constraint. The first support is biased by a much lighter force than the second support, so that its friction is very low. This reduces the lobing and hysteresis of the stylus movement, and thereby increases the accuracy of the probe.

55 Claims, 5 Drawing Sheets

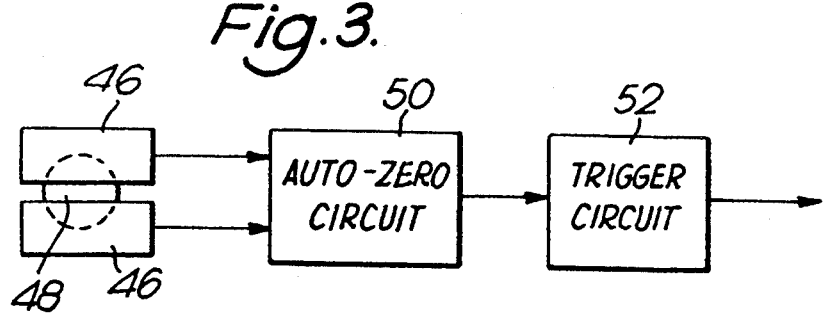
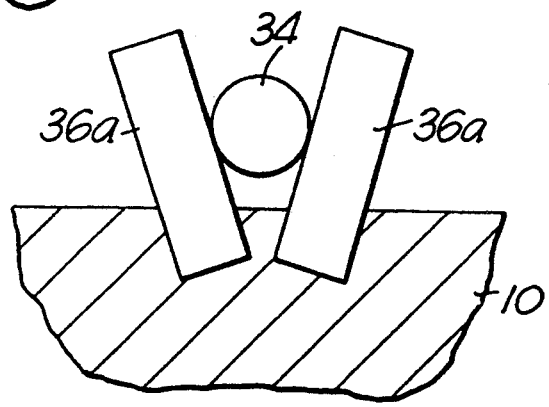
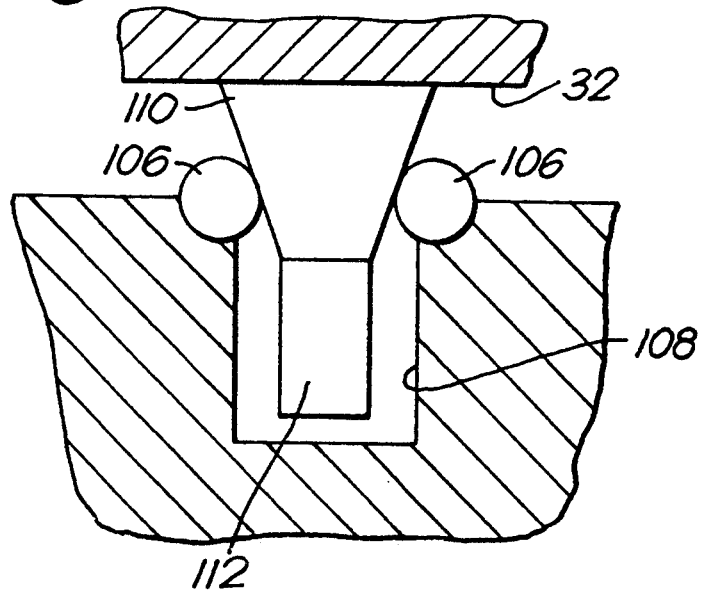

TOUCH PROBE

This is a continuation of application Ser. No. 07/944,341 filed Sep. 14, 1992, now U.S. Pat. No. 5,253,428, which in turn is a continuation of application Ser. No. 07/660,048 filed Feb. 25, 1991, now U.S. Pat. No. 5,146,691.

FIELD OF THE INVENTION

This invention relates to touch probes for position determining apparatus such as machine tools and coordinate measuring machines.

DESCRIPTION OF PRIOR ART

Such machines have a spindle, quill or arm which is movable in two or three dimensions and which can carry a touch probe or other tool. Scales or other measuring devices measure the position of the probe or tool in the two or three dimensions. A touch probe for use with such a machine has a deflectable stylus extending from its body, for contacting a workpiece surface.

Touch probes for such applications which have been extremely successful commercially, are shown in, for example, U.S. Pat. No. 4,153,998 (McMurtry). Within the probe body there is a kinematic support arrangement, into which a stylus holding member is urged axially by a spring. The kinematic support arrangement thus supports the stylus in a rest position relative to the body, the rest position being extremely repeatable in space. When the stylus contacts a workpiece surface, a trigger signal is generated by the probe, which is used to trigger the taking of a reading of the instantaneous position of the movable spindle, quill or arm. Because of the repeatability of the stylus rest position, this is an accurate measure of the position in space of the point of contact between the stylus and the workpiece. The stylus is deflectable against the spring bias, to prevent damage, and subsequently returns to the repeatable rest position.

Several different types of kinematic support arrangements are disclosed in U.S. Pat. No. 4,153,998. One arrangement disclosed has three support locations spaced around the axis of the probe. At each support location, there is a support element (e.g. a cylinder) on the stylus holding member, which is urged into engagement with a pair of support elements (e.g. a pair of balls) which have mutually convergent surfaces. This arrangement of three elements located in respective pairs of convergent surfaces provides both an axial constraint and a lateral constraint on the stylus when it is in the rest position, thereby providing a unique kinematic rest position which is extremely repeatable.

A second alternative arrangement as described in U.S. Pat. No. 4,153,998 has three support elements on one of the members, bearing against a flat surface in the axial direction in order to provide an axial rest position. A separate lateral constraint is provided in order to give, in combination with the axial constraint, a unique kinematic rest position. Several different forms of lateral constraint are disclosed. Another example of a lateral constraint which can be used is a planar spring extending in the lateral direction, connected at one end to the stylus member and at the other end to the housing. An example is shown in U.S. Pat. No. 4,451,987 (Cusack).

Although such probes have been widely used with great success, the measurement requirements of industry are nowadays becoming more demanding, and so it is becoming increasingly necessary to take account of certain problems of such probes which were previously of less importance.

For example, because of the three support locations, such probes exhibit a phenomenon known as "lobing". This can be explained as follows. As the probe travels towards a workpiece surface, there is always a small distance travelled between the instant at which the stylus contacts the workpiece, and the instant at which the probe generates a trigger signal as a result of such contact. This is known as "pre-travel". For a given direction of contact with the workpiece, the pre-travel is extremely repeatable, and its effects can therefore be compensated by calibration. However, because of the nature of the three support locations, the pre-travel varies considerably for different directions of contact, giving a lobed characteristic to the response of the probe in a plane normal to the axis, (known as the XY plane) and necessitating a different calibration and compensation value for each direction. The lobing effect is proportional to the axial force which urges the kinematic seating elements together, especially in the case where the trigger signal is generated by electrical switching at the seating elements.

To reduce the lobing effect, it is obviously desirable to have as low a spring force as possible. However, there is a practical lower limit to the spring force, since a certain minimum spring force is required to keep the kinematic support elements seated on each other in the event of acceleration or vibration of the probe as it is moved; otherwise consequent unseating will result in false trigger signals being generated.

Such convergent surface probes can very occasionally also suffer from a problem of hysteresis when reseating. This can be caused by friction between the seating elements, causing the single element at one of the locations not to seat fully with the corresponding pair of convergent surfaces. The consequent vertical error in the position of this element, causing tilting of the stylus member, gives rise to a corresponding lateral error in the rest position of the stylus tip. The direction of this lateral error depends on the direction from which the stylus is reseating. The lateral error is magnified by a lever effect proportional to the length of the stylus, and is rather more significant than any lateral reseating error of the support element in its pair of convergent surfaces.

The other type of probe noted above, having three support elements resting on flat surfaces, and a separate lateral constraint, also has the disadvantages of lobing and hysteresis. Although the stylus member returns to a repeatable rest position for a given direction of contact with the workpiece, different directions of contact in the XY plane tend to give slightly different rest positions. This is also due to friction between the support elements and the supporting flat surface, as they slide over each other in the XY direction. As the probe reseats, the support elements slide over the flat surface in the XY plane, until the tension of the lateral constraint acting in the XY plane reduces to a certain residual level at which it is unable to overcome the remaining frictional force in the XY plane at the support element surfaces.

Probes are also known having an axial constraint consisting of more than three support elements upon a flat surface (e.g. U.S. Pat. No. 4,763,421), or of a continuous annular ring supporting or supported on a flat surface (e.g. U.S. Pat. No. 4,477,976). Whilst this may reduce the lobing problem, the hysteresis problem remains and may even be worse.

SUMMARY OF THE INVENTION

Preferred embodiments of the present invention incorporate advantageous features of both types of prior art probe discussed above, while minimising their respective disadvantages.

BRIEF DESCRIPTION OF THE DRAWINGS

The preferred embodiments will now be described with reference to the accompanying drawings, wherein:

FIG. 3 shows a detector arrangement for the probe of FIG. 1,

FIG. 8 is a view on the line VIII in FIG. 1, showing another modification,

FIG. 9 is a view corresponding to FIG. 8, showing a still further modification.

DESCRIPTION OF PREFERRED EMBODIMENTS

Figure 1:
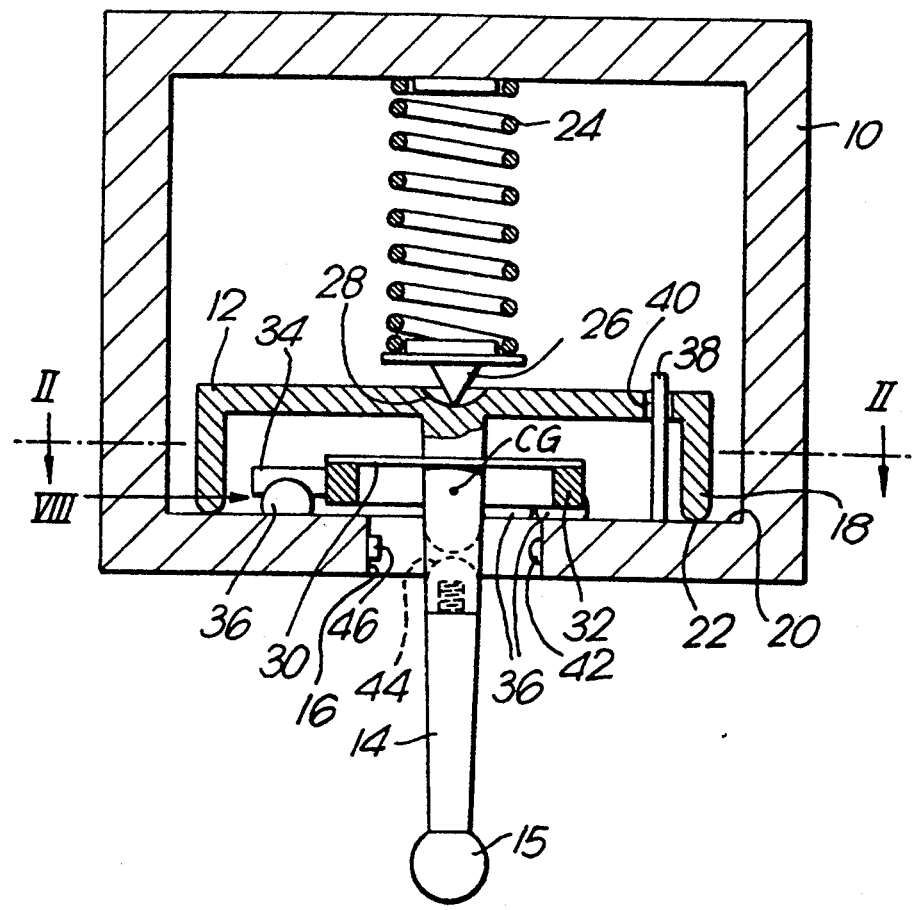
FIG. 1 is a vertical cross section through a first probe.
Figure 2:
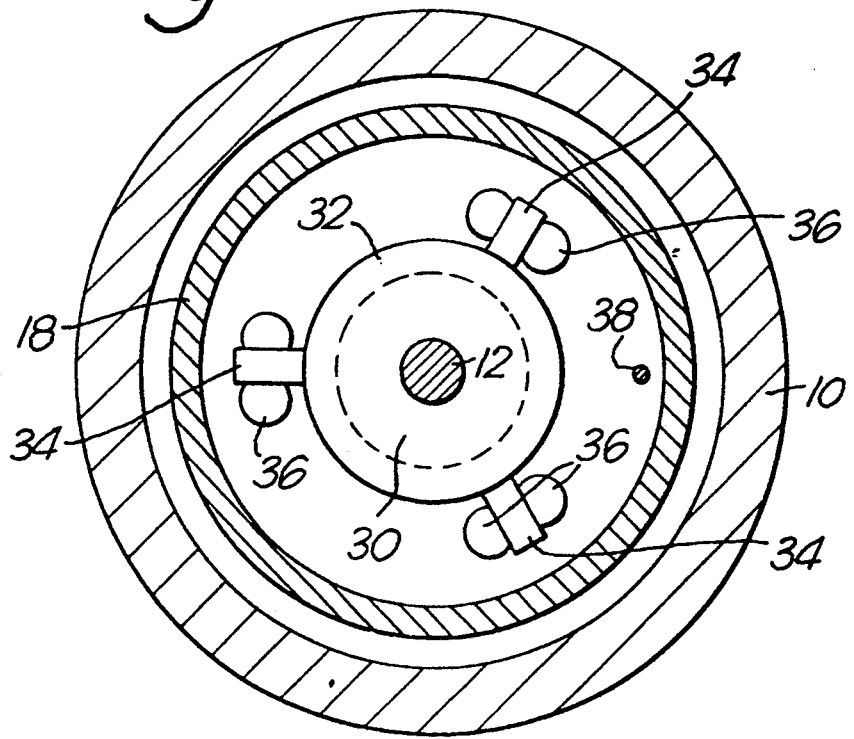
FIG. 2 is a horizontal cross section on the line II—II in FIG. 1.

Referring firstly to FIGS. 1 and 2, the probe shown comprises a housing 10, within which is located a stylus holder 12. The stylus holder 12 carries a stylus 14, which projects through an aperture 16 in the housing 10. The stylus has a tip 15 for contacting a workpiece, and such contact causes deflection of the stylus.

The stylus holder 12 is cup-shaped, having a depending skirt 18. The annular bottom edge 22 of the skirt 18 rests on a flat internal surface 20 of the housing 10. The surfaces 22 and 20 are manufactured by lapping them together, so that they are extremely flat and conform with each other. This ensures that the stylus holder 12 is supported in a precise axial rest position. It is biased into this axial rest position by a spring 24, which causes a conical member 26 to bear in a recess 28 in the stylus holder.

As well as being located in a precise axial rest position, the stylus holder 12 and its depending stylus 14 are also located in a very precise lateral rest position. This is ensured as follows. A diaphragm-like planar spring 30 is secured in its central region to the stylus holder 12, at the point from which the stylus 14 depends from the stylus holder 12. At its outer perimeter, the planar spring 30 is secured to a ring 32. Three cylinders 34 project radially from the ring 32, and seat in the convergent surfaces provided by respective pairs of balls 36, which are fixed on the housing 10. Thus, the ring 32 is located in a kinematically-defined rest position, both axially and laterally, in the same manner as described in U.S. Pat. No. 4,153,998. With respect to the ring 32, the planar spring 30 holds the stylus holder 12 in an extremely well-defined lateral rest position. However, the planar spring 30 can flex to allow vertical movement and tilting of the stylus holder 12 with respect to the ring 32; such movements are only constrained by the axial rest position provided by the surfaces 20 and 22.

Thus, the stylus 14 is held in a precisely defined rest position by a combination of an axial constraint and a lateral constraint. Although the balls 36 and cylinders 34 provide axial constraint as well as lateral constraint, the axial flexibility of the planar spring 30 ensures that the stylus holder 12 is not over-constrained.

A dowel 38 is fixed to the housing 10 and extends through a hole 40 in the stylus holder 12, with sufficient clearance so as not to interfere with normal operation of the probe. The purpose of this dowel is to prevent rotation of the stylus holder 12 when an exchangeable stylus 14 is being screwed into the stylus holder. The dowel also provides a measure of guidance to ensure that the cylinders 34 correctly reseat in the pairs of balls 36 after a deflection of the stylus.

The planar spring 30 is pre-stressed, and in its relaxed state it is bowed upward, in the manner of a Belleville washer. However, it assumes the flat, stressed condition shown in FIG. 1 under the biasing provided by the spring 24. Considering the forces acting upon the stylus holder 12 in the rest position, the downward force provided by the spring 24 is only slightly greater than, and is largely counterbalanced by, the upward bowing force of the planar spring 30. Consequently, the pressure between the surface 20 of the housing and the surface 22 of the skirt 18 is very small. Since the friction between the surfaces 20 and 22 is proportional to this pressure, the friction is also very small.

When the stylus 14 contacts a workpiece, from any direction, the stylus is deflected. For example, if the contact is in a horizontal direction, the stylus 14 tilts, about a point of contact between the surfaces 20 and 22. At this time, the cylinders 34 and balls 36 remain engaged with each other, and the tilting is accommodated by flexing of the planar spring 30. As deflection of the stylus 14 continues, and the pre-stressing of the planar spring 30 is relieved, the further deflection is accommodated by lifting of at least one of the cylinders 34 out of its seating with the associated balls 36.

Because the initial deflection is accommodated only by the tilting of the skirt 18 on the surface 20, and not by movement of the kinematically-mounted ring 32, the force required to produce the deflection is the same from all horizontal directions. This is because of the annular nature of the skirt 18. As a result, this initial deflection is entirely non-lobing. It is also extremely sensitive, because of the low contact force between the surfaces 20 and 22.

When the deflecting force on the stylus 14 ceases (i.e. when the probe is moved so that the stylus 14 no longer contacts the workpiece) the stylus member 12 is returned to its axial and lateral rest position by the action of the spring 24. In doing so, it is likely that there will be some rubbing of the surfaces 20 and 22 against each other, and also of the cylinders 34 against the balls 36. The friction inherent in such rubbing is a source of hysteresis in conventional probes, when the spring force is unable completely to overcome the frictional forces to return the stylus holder to the precise rest position. In the present probe this is reduced because of the very light pressure between the surfaces 20 and 22, which means that the frictional forces are extremely low. Thus, there is little frictional force preventing the skirt 18 moving laterally to the lateral rest position; and since the surfaces 20 and 22 are flat, there is no resistance preventing the skirt 18 from moving into the axial rest position.

During the reseat operation, the lateral rest position is in fact assured positively by the cylinders 34 and balls 36, and by the planar spring 30. It is of course still possible for frictional forces between the cylinders 34 and balls 36 to have an effect. Thus, friction between the cylinders 34 and balls 36 may prevent one or more of the cylinders 34 from completely reseating in its rest position between the corresponding pairs of balls 36. However, any resulting mis-positioning will largely be in the vertical direction rather than the horizontal direction. This is accommodated by a flexure of the planar spring 30, and therefore does not disturb the axial rest position of the stylus holder 12 (since this is dependent upon the skirt 18 returning to its axial rest position). Such mis-positioning between the cylinders 34 and balls 36 has a much less significant effect upon the lateral rest position. Furthermore, any lateral mis-positioning which might occur causes only a lateral translation of the rest position of the stylus 14; it does not cause it to tilt as in the case of the prior art. Thus, the magnitude of the mis-positioning of the stylus tip 15 is only the same as the magnitude of the lateral mis-positioning of the ring 32, whereas in the prior art probes the leverage effect caused by the length of the stylus 14 would greatly magnify the mis-positioning of the stylus tip 15 when the stylus 14 tilts.

FIG. 8 shows a modification which can reduce any lateral mis-positioning of the ring 32 even further. In place of the balls 36, each roller 34 is located between two cylindrical rollers 36a, forming a V groove. The sides of the V groove are deliberately made very steep, so that any mismatch is more evident in the vertical direction than in the lateral direction. If desired, a similar effect could be achieved with the balls 36 of FIG. 1 by setting them slightly further apart than would be conventional.

FIG. 9 shows a further modification of the type shown in FIG. 8. It comprises two cylinders 106, in place of the pair of balls 36. The cylinders 106 are seen end-on in FIG. 9, and are parallel to each other, lying radially with respect to the axis of the probe. Between them, there is a recess 108 in the housing 10. In place of the cylinder 34 in FIG. 1, a conical element 110 depends from the ring 32. In the kinematic rest position, this conical member 110 is urged against the pair of cylinders 106 as shown in the figure. The apex of the conical element 110 has a cylindrical extension 112, which in the rest position is accommodated in the recess 108.

The cone angle of the conical element 110 is made very steep. In consequence, any mis-positioning due to friction effects when the ring 32 is brought back to the rest position, occurs primarily in the vertical direction rather than in the lateral direction. The steepness of the cone angle thus performs the same function as the steep sided V formed by the cylinders 36a in FIG. 8. The extension 112 remains between the cylinders 106 when the ring 32 lifts and the conical element 110 disengages. This extension 112 thus acts as a guide to ensure correct return of the conical element 110 into contact with the cylinders 106, and it also obviates the need for the dowel 38.

The instant at which the stylus tip 15 first contacts a workpiece can be detected in various possible ways. For example, it is possible to mount piezo-electric detectors or strain gauges on the stylus holder 12 to detect the initial contact (for example as described in International Patent Specification No. WO86/03829). Alternatively, the contact can be detected by arranging that an electric circuit between the stylus tip 15 and the workpiece is closed by the contact. As shown in FIG. 1, however, our presently preferred method is photo-electric. A light emitting diode 42 produces a beam of light which passes through an opening 44 in the stylus holder 12. This produces a spot of light 48 upon a pair of light detectors 46 arranged side by side as seen more clearly in FIG. 3. The outputs of the detectors 46 are taken to an auto zero circuit 50 having differential inputs. The function of the circuit 50 is to track any long-term drift of the outputs of the detectors 46, so that the output of the circuit 50 is a constant value (e.g. zero) despite any such long-term drift. However, if there is any more sudden mismatch between the differential inputs received from the detectors 46, the auto zero circuit 50 reacts, its output increases, and a trigger circuit 52 produces a trigger signal as a result. Thus, the auto zero circuit 50 is responsive to rates of change of the differential inputs which exceed a given value, such as would be caused when the light spot 48 moves towards one or other of the detectors 46 when the stylus 14 begins to deflect upon contact with a workpiece. Further description of such an auto zero circuit can be found in EP No. 0242747.

Figure 4:
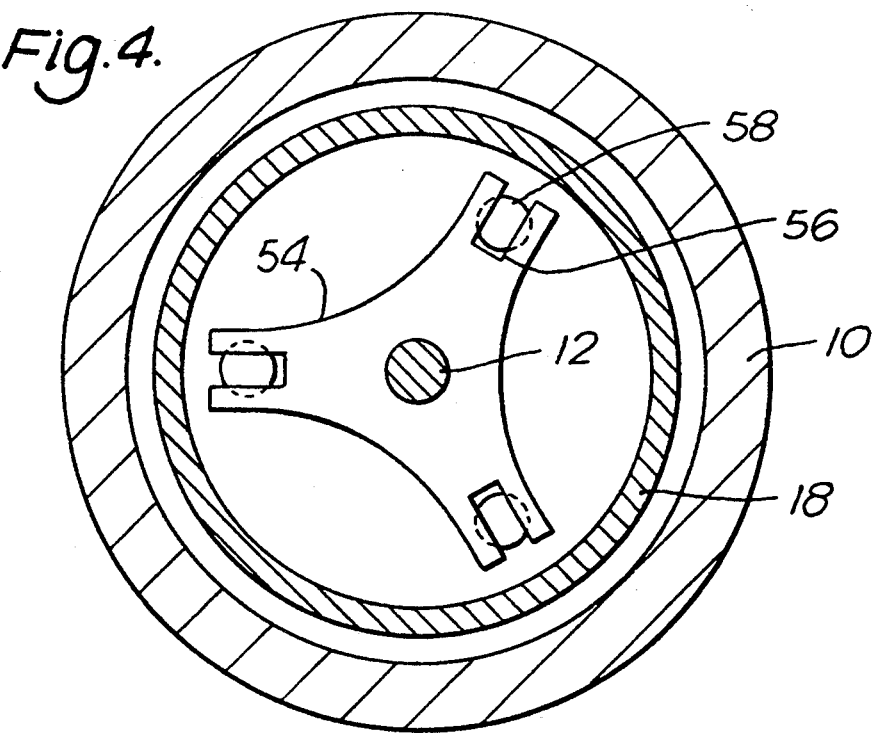
FIG. 4 is a view corresponding to FIG. 2, but showing a modification.

FIG. 4 shows a modification of the probe of FIGS. 1 and 2. The planar spring 30, ring 32 and cylinders 34 are replaced by a generally triangular planar spring 54. At each of the apices of the triangle, a radial slot 56 is cut into the planar spring. This defines a fork at each apex. In place of the three pairs of balls 36 fixed to the housing 10, there are three single balls 58, and each slot 56 locates over one of the balls 58. This arrangement provides a precise lateral rest position in the same manner as FIG. 1, but is less expensive to manufacture.

The skirt 18 in FIG. 1 may be made from a ceramic material, and may bear against a ceramic annulus in the housing 10 forming the surface 20. The ceramic materials are preferred because they can be lapped against each other to produce a seating having a very high degree of flatness, and thus precision.

Figure 10:
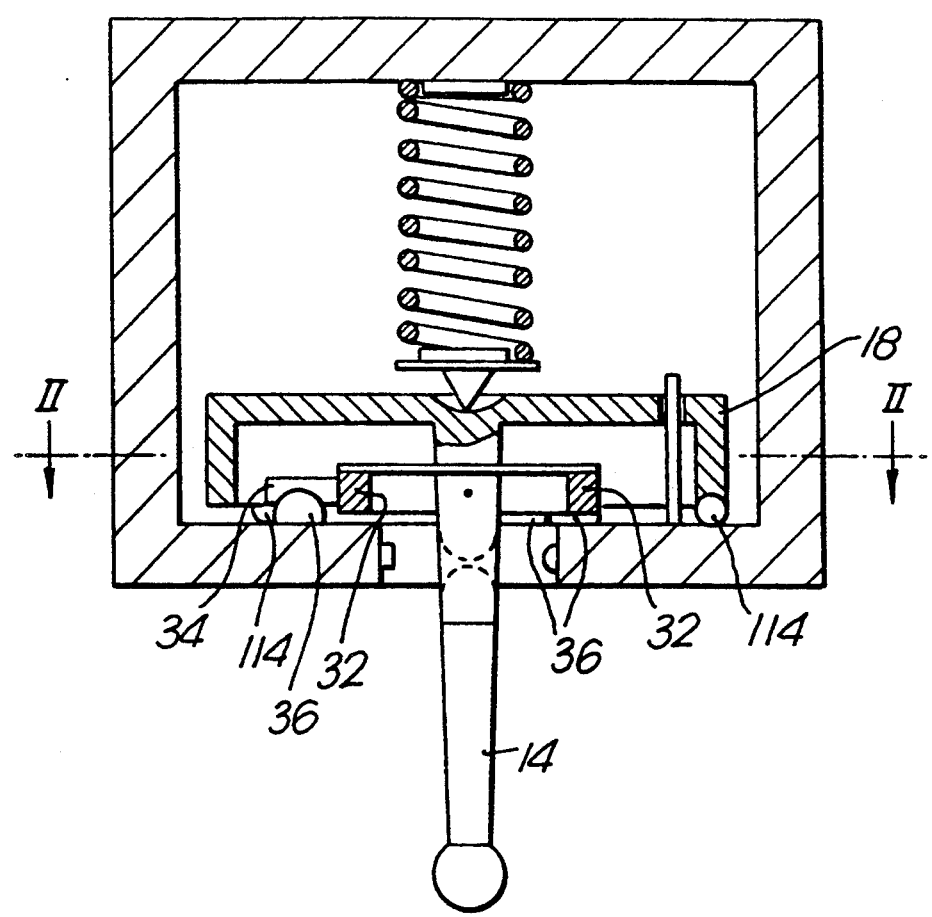
FIG. 10 is a section through a modification of the probe in FIG. 1.

Alternatively, as shown in FIG. 10, in place of the lapped surfaces 20 and 22, the skirt 18 may have on its undersurface three balls 114, equispaced around the axis of the probe, which bear against the surface 20. As described in U.S. Pat. No. 4,153,998, such an arrangement of three balls 114 on a plate gives a very precise axial rest position, without the need for lapping. However, because of the three point support, such an arrangement is subject to some degree of lobing. While the lobing is worse than the arrangement in FIG. 1, it is nevertheless better than the prior art, because of the very low force between the skirt 18 and the surface 20. The degree of lobing, of course, is proportional to this force, which must be overcome in order to deflect the stylus.

If such an arrangement of three balls 114 is used, it becomes possible to detect the deflection of the stylus by electrical switching between the balls 114 and the surface 20. This is described more fully in U.S. Pat. No. 4,153,998. In such a case, it is possible for the balls 114 on the skirt 18 to be much smaller than would be necessary in the prior art. The prior art arrangement needs balls of a relatively large radius in order to give the loading capability. However, with the probe of FIG. 10, the loading between the skirt 18 and the surface 20 is very small, so that small balls 114 can be used. This ensures that the same Hertzian stressing occurs between the balls and the surface 20 as in the prior art large radius balls, so that the electrical characteristics of the contacts are unaffected, whilst still keeping a low loading between the skirt 18 and the surface 20 so as to minimise lobing.

It is desirable to ensure that the respective weights of the stylus holder 12 and stylus 14 are chosen such that the centre of gravity CG of the stylus and stylus holder combination is roughly in the same horizontal plane as the axial and lateral constraints which define the rest position. This helps to ensure that, despite the relatively low axial loading which keeps the skirt 18 in place on the surface 20, nevertheless there is little risk of accidental deflection of the stylus 14 owing to vibration or inertial effects as the probe is moved.

As an alternative to the arrangement in FIG. 10, a ring of balls may be provided on the undersurface of the skirt 18 to bear against the surface 20. Such a ring of balls is manufactured by inserting them in an annular plate, each in a respective bore, and bonding them in place with capillary glue. The annular plate is clamped against the surface 20, with the balls in contact with the surface 20, while the glue sets. This ensures that there is an accurate axial rest position, with all the balls contacting the surface 20, and gives a substantially non-lobing performance.

Figure 5:
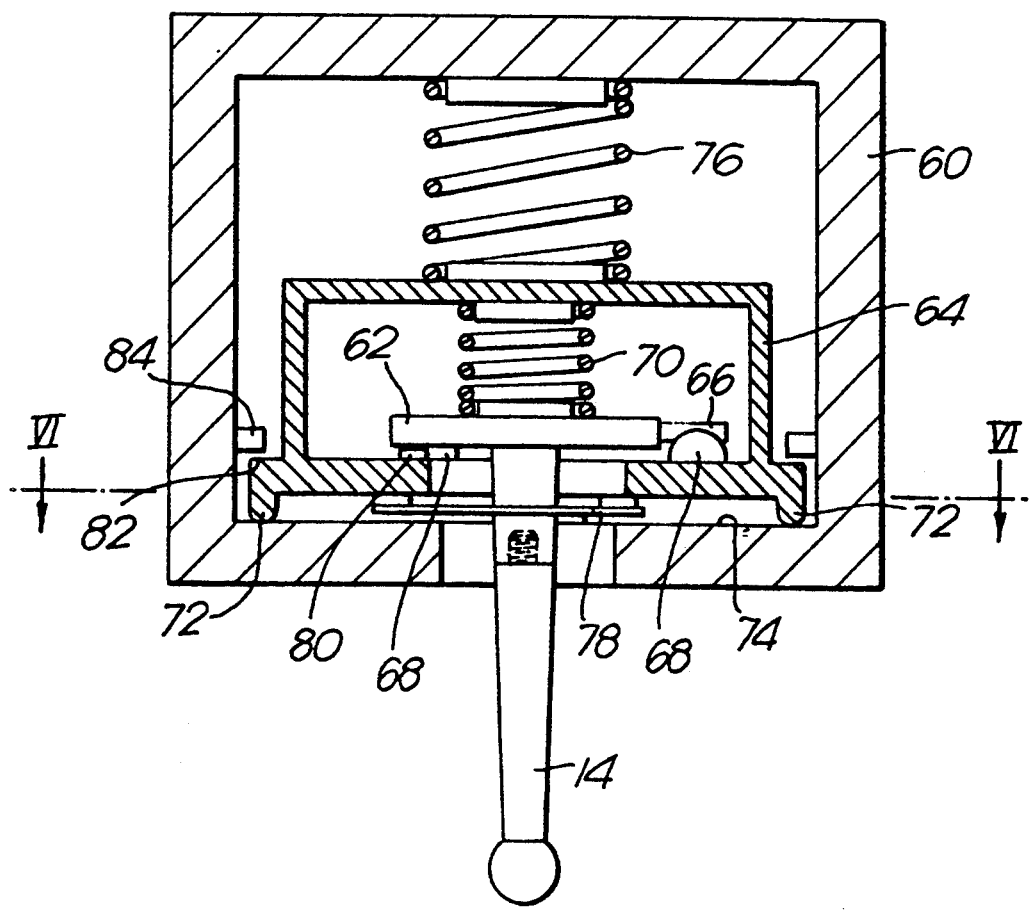
FIG. 5 is a vertical cross section through a second probe.
Figure 6:
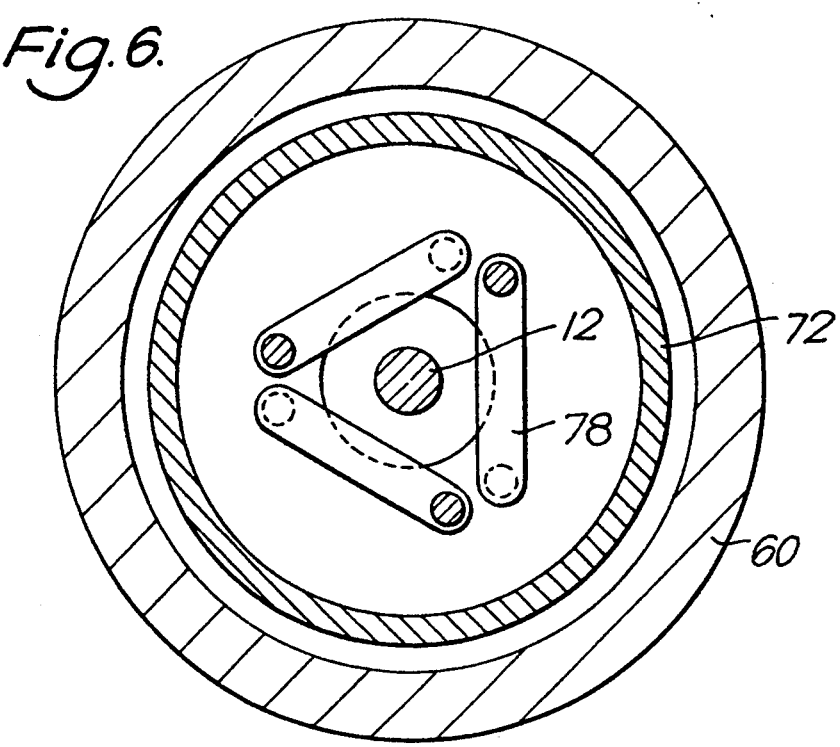
FIG. 6 is a horizontal cross section on the line VI—VI in FIG. 5.

FIGS. 5 and 6 show a second probe according to the present invention. Within a housing 60, there is a stylus holder 62, from which depends a stylus 14 as previously. The stylus holder 62 lies within an intermediate cage 64, and is located within that cage by a kinematic arrangement of cylinders 66 and pairs of balls 68, arranged generally similar to the cylinders 34 and balls 36 of FIG. 1. The cylinders 66 and balls 68 are biased into engagement with each other by a spring 70 within the cage 64.

The cage 64 has a depending annular skirt 72, which engages with a surface 74 of the housing 60, in the same way as the skirt 18 engages with the surface 20 of the housing 10 in FIG. 1. As in FIG. 1, the skirt 72 and the surface 74 may be of ceramic, and are manufactured by lapping against each other so as to give a good axial rest position for the cage 64. The cage 64 is biased into this rest position by a spring 76. The force on the cage due to the spring 76 is relatively small, and much smaller than the force on stylus holder 62 due to the spring 70, so that the axial load between the skirt 72 and the surface 74 is very small. This gives very low friction between the skirt 72 and the surface 74, which gives good lobing and hysteresis characteristics in the same way as the probe of FIG. 1.

The cage 64 is located laterally in a rest position by a planar spring arrangement. As can be seen in FIG. 5, this is connected directly between the cage 64 and the housing 60, and unlike FIG. 1 is not directly secured to the stylus holder 62. One arrangement provides three elongate planar springs 78, in a triangular arrangement grouped about the axis of the probe, as more clearly seen in FIG. 6. One end of each spring 78 is secured to the cage 64, while the other end of each is secured to the housing 60. These springs 78 are not prestressed, but are flat in a relaxed condition, and thus do not contribute to the loading between the skirt 72 and the surface 74.

Thus, the stylus holder 62 is supported in a completely kinematic manner in the cage 64 by the cylinders 66 and balls 68, and is urged into this support by the spring 70; all of these elements inside the cage 64 comprise a closed system which can move bodily with respect to the housing 60. The cage 64, in turn, has a good axial constraint provided by the skirt 72 and surface 74; and a good lateral constraint provided by the planar springs 78.

In operation, when the stylus 14 is deflected by contact with a workpiece, at first the skirt 72 and cage 64 lift or tilt bodily from the surfaces 74. The stylus holder 62 is prevented from lifting within the cage 64 by three permanent magnets 80 (only one of which can be seen in the figure), which retain the cylinders 66 in engagement with the balls 68. This bodily lifting or tilting of the cage 64 is opposed only by the small force of the spring 76, giving the low loading between the skirt 72 and the surface 74, so that the initial movement of the probe has a non-lobing characteristic, for the same reason as in the probe of FIG. 1. Also for the same reason, when eventually the stylus returns to its rest position, there is little or no hysteresis in its rest position.

However, the above bodily lifting or tilting of the cage 64 upon deflection of the stylus only lasts for a very small amount of stylus deflection. There is only a very small clearance 82 (e.g. 10 microbes) between the upper edge of the skirt 72 and a shoulder 84 which extends around the inside of the housing 60. After sufficient deflection to take up this clearance 82, further deflection of the stylus 14 causes one or more of the cylinders 66 to disengage from the respective balls 68, against the action of the spring 70 and magnets 80.

In this embodiment of FIGS. 5 and 6, the annular lapped contact region between the skirt 72 and the surface 74 may if desired be replaced by three balls engaging against a plate, or by a ring of balls engaging against a plate, as described above in relation to the modification of FIG. 1 shown in FIG. 10.

Figure 7:
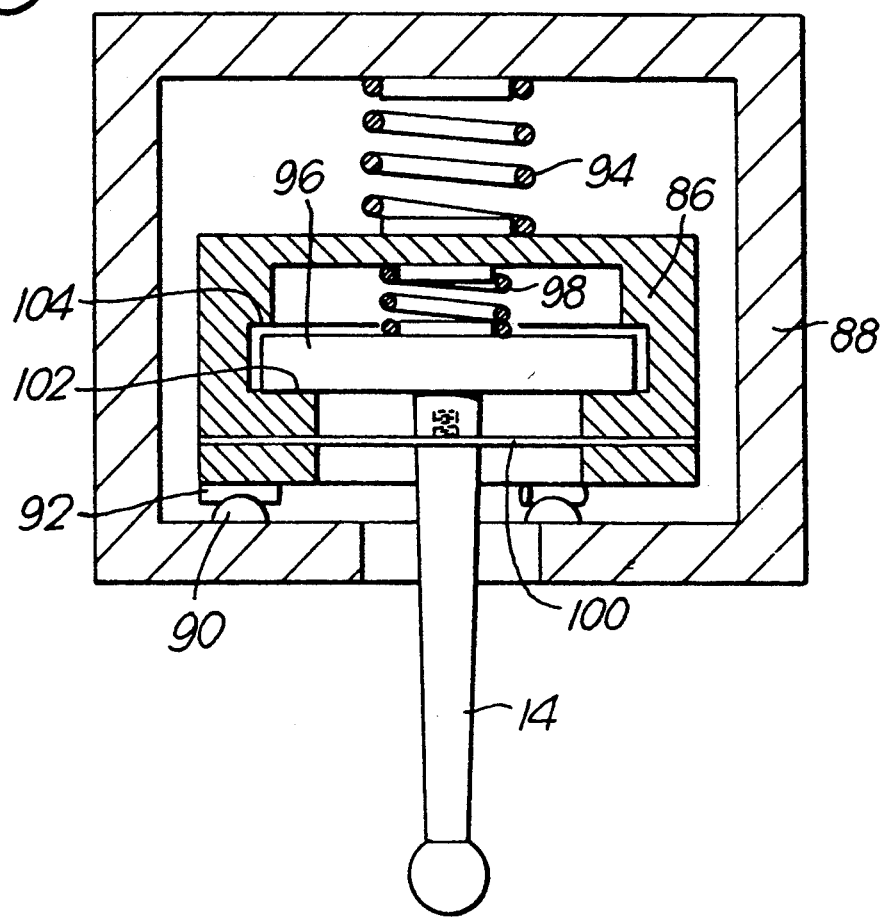
FIG. 7 is a vertical cross section through a third probe.

FIG. 7 shows a further embodiment. A cage 86 is provided within a housing 88. The cage 86 is kinematically located on balls 90 and rollers 92, similar to those numbered 34 and 36 in FIG. 1. A spring 94 biases the cage 86 into a kinematically-defined rest position on these cylinders and balls.

Inside the cage 86, there is a stylus holder 96, from which depends a stylus 14 as previously. The stylus holder 96 is biased into a rest position within the cage 86 by a spring 98 with a smaller force than that which biases the cage 86 into its rest position. The rest position of the stylus holder 96 within the cage 86 is defined laterally by a diaphragm-like planar spring 100, which is connected to the stylus holder in its central region in the same manner as the planar spring 30 in FIG. 1. However, the planar spring 100 is not prestressed, but is in a relaxed condition when flat as shown in FIG. 7. The rest position of the stylus holder 96 is axially defined by flat surfaces on the stylus holder 96 and cage 86 at 102. These surfaces are lapped with each other to give good axial positioning, as previously. The respective components may be of ceramic material to facilitate this as previously.

In operation, when the stylus 14 is deflected by contact with a workpiece, the cage 86 initially remains stationary in its kinematic rest position defined by the balls and cylinders 90,92. The initial deflection is taken up by movement of the stylus holder 96 within the cage 86, against the action of the spring 98, such movement being permitted by flexing of the planar spring 100. The axial loading between the stylus holder 96 and the cage 86, at the surfaces 102, is very light, as previously, by reason of the light spring 98. In consequence, the deflection of the stylus is non-lobing and substantially hysteresis-free, for the same reasons as previously.

Only a relatively small amount of movement of the stylus holder 96 within the cage 86 is permitted, before the stylus holder 96 engages a shoulder 104 within the cage. As with the shoulder 84 in FIG. 5, there is only a small clearance before this happens. Subsequent deflection of the stylus 14 is accommodated by bodily movement of the cage 86, out of its kinematic seating elements 90,92, against the action of the spring 94.

In a similar manner to the modification of FIGS. 5 and 6 discussed above, the lapped flat surfaces 102 in FIG. 7 can be replaced by three balls bearing on a plate, or a ring of balls bearing on a plate.

All of the embodiments of FIGS. 4–10 may have any of the arrangements for detecting the instant of contact between the stylus tip and a workpiece, as discussed above in relation to the FIG. 1 embodiment. The centre of gravity of the stylus and stylus holder may also be as discussed in FIG. 1.

It is a feature of all the embodiments described that the planar spring 30,78 or 100 does not have to flex for any great distance. In the case of the probes of FIGS. 5 to 7, this is because the small clearance before engagement with the shoulder 84 or 104 prevents any further flexing of the planar spring. Further overtravel of the stylus 14 is in each case accommodated by the disengagement of the cylinders and balls 66,68 and 92,90, without further flexing of the planar spring. In the case of the probe of FIG. 1, although there is no shoulder preventing flexing, nevertheless the overtravel of the stylus can be accommodated by disengagement of the cylinders and balls 34,36 without flexing of the planar spring 30. This is in contrast to prior art probes in which lateral constraint is provided by a planar spring, (such as U.S. Pat. No. 4,451,987 referred to above) which must also permit overtravel. Such prior art probes require a relatively floppy planar spring to allow for such stylus overtravel. With the probes described above, this is not necessary, and so the planar spring can in each case be made substantially stiffer. This considerably improves the force with which the planar spring resists any residual lateral displacement of the skirt 18 in FIG. 1, the skirt 72 in FIG. 5, or the stylus holder 96 in FIG. 7. The greater lateral resistance results in further reductions in the hysteresis of the frictional contact between the surfaces 20,22 (FIG. 1); between the skirt 72 and surface 74 (FIG. 5); and between the surfaces 102 (FIG. 7).

A further feature of all the probes described is that while the force required for the initial deflection of the stylus is deliberately made very low, to reduce or eliminate the lobing and hysteresis problems, nevertheless the force causing the cylinders 34,66,92 to seat in the ball pairs 36,68,90 is still very high, so that good reseating can be assured. In fact, the force with which the cylinders are urged into engagement with the respective balls can be higher than would normally be the case with prior apt probes having such kinematic seating arrangements, since increasing this force does not reduce the lobing and hysteresis performance of the probe.

I claim:

1. A touch probe for position determining apparatus, comprising:
    a fixed member having an axis;
    a movable member for carrying a workpiece-contacting stylus;
    a spring biasing the movable member into a rest position relative to the fixed member, the movable member being movable out of the rest position against the action of the spring when a force is applied to the stylus;
    a detector for providing a signal when said stylus contacts a workpiece; and
    a constraint mechanism between the fixed and movable members for constraining movement of the movable member when it is biased into the rest position; the constraint mechanism including:
    an intermediate member which is movable relative to the fixed and movable members;
    a kinematic support between the intermediate member and the fixed member, comprising elements on one of the intermediate and fixed members which are engageable with corresponding surfaces on the other one of the intermediate and fixed members, thereby to constrain movement of the intermediate member relative to the fixed member when said elements and surfaces are engaged, the intermediate and fixed members being relatively rotatable when said elements and surfaces are disengaged; and
    a planar spring between the intermediate member and the movable member, for preventing relative rotation therebetween, but permitting axial and tilting movements therebetween while said elements and surfaces of the kinematic support remain engaged.

2. A touch probe according to claim 1, including stop elements for limiting rotation of the movable member relative to the fixed member when said elements and surfaces of the kinematic support are disengaged to permit rotation, the stop elements being located on the fixed and movable members respectively and being normally separated by a clearance but engaging with each other after limited relative rotation.

3. A touch probe according to claim 2, wherein said stop elements comprise a dowel on one of the fixed and movable members and an opening on the other of said fixed and movable members, the dowel being located in the opening with said clearance.

4. A touch probe according to claim 1, wherein said engageable elements and surfaces take the form of three elements on said one of said intermediate and fixed members, engageable with respective pairs of mutually convergent surfaces on the other one of said intermediate and fixed members.

5. A touch probe according to claim 1, further including a pair of axially confronting surfaces, one on the fixed member and one on the movable member, which are engageable tiltably so as to permit tilting of the movable member when the stylus engages the workpiece.

6. A touch probe according to claim 5, wherein said axially confronting surfaces are disposed annularly around said axis.

7. A touch probe according to claim 6, wherein said axially confronting surfaces comprise a lower edge of a depending skirt on the movable member, and an upwardly facing flat surface on the fixed member.

8. A touch probe according to claim 6, wherein said axially confronting surfaces comprise an edge of a depending skirt on the movable member, and a flat surface on the fixed member opposing said edge.

9. A touch probe for position determining apparatus, comprising:
    a fixed member having an axis;

a movable member for carrying a workpiece-contacting stylus;

a spring biasing the movable member into a rest position relative to the fixed member, the movable member being movable out of the rest position against the action of the spring when a force is applied to the stylus;

a detector for providing a signal when said stylus contacts a workpiece; and a constraint mechanism between the fixed and movable members for constraining movement of the movable member when it is biased into the rest position; the constraint mechanism including:

an intermediate member which is movable relative to the fixed and movable members;

a first constraint device between the intermediate member and a first one of the fixed and movable members, comprising at least one element on one of said first and intermediate members which is engageable with at least one corresponding surface on the other one of said first and intermediate members, thereby to constrain relative movements between said first and intermediate members when said element and surface are engaged, said first and intermediate members being relatively rotatable upon application of sufficient force to the movable member; and a second constraint device between the intermediate member and a second one of the fixed and movable members, said second constraint device being permanently fastened between said second and intermediate members for preventing relative rotation therebetween, but permitting substantial relative axial and tilting movements between said second and intermediate members while said element and surface of the first constraint device remain engaged.

10. A touch probe according to claim 9, including stop elements for limiting rotation of the movable member relative to the fixed member when said element and surface of the first constraint device are disengaged to permit rotation, the stop elements being located on the fixed and movable members respectively and being normally separated by a clearance but engaging with each other after limited relative rotation.

11. A touch probe according to claim 10, wherein said stop elements comprise a dowel on one of the fixed and movable members and an opening on the other of said fixed and movable members, the dowel being located in the opening with said clearance.

12. A touch probe according to claim 9, wherein the first constraint device is provided between the intermediate member and the fixed member, and the second constraint device is provided between the intermediate member and the movable member.

13. A touch probe according to claim 9, wherein the second constraint device includes at least one planar spring.

14. A touch probe according to claim 9, wherein the first constraint device is a kinematic support.

15. A touch probe according to claim 14, wherein the kinematic support has three of said elements on said one of said members, engageable with three corresponding pairs of mutually convergent said surfaces on the other one of said members.

16. A touch probe according to claim 9, further including a pair of axially confronting surfaces, one on the fixed member and one on the movable member, which are engageable tiltably so as to permit tilting of the movable member when the stylus engages the workpiece.

17. A touch probe according to claim 16, wherein said axially confronting surfaces are disposed annularly around said axis.

18. A touch probe according to claim 17, wherein said axially confronting surfaces comprise a lower edge of a depending skirt on the movable member, and an upwardly facing flat surface on the fixed member.

19. A touch probe according to claim 17, wherein said axially confronting surfaces comprise an edge of a depending skirt on the movable member, and a flat surface on the fixed member opposing said edge.

20. A touch probe for position determining apparatus, comprising:

a fixed member having an axis;

a movable member for carrying a workpiece-contacting stylus;

a spring biasing the movable member into a rest position relative to the fixed member, the movable member being movable out of the rest position against the action of the spring when a force is applied to the stylus;

a detector for providing a signal when said stylus contacts a workpiece; and a constraint mechanism between the fixed and movable members for constraining movement of the movable member when it is biased into the rest position; the constraint mechanism including:

an intermediate member which is movable relative to the fixed and movable members;

a first constraint device between the intermediate member and a first one of the fixed and movable members, comprising at least one element on one of said first and intermediate members which is engageable with at least one corresponding surface on the other one of said first and intermediate members, thereby to constrain relative movements between said first and intermediate members when said element and surface are engaged, said first and intermediate members being relatively rotatable upon application of sufficient force to the movable member; and a second constraint device between the intermediate member and a second one of the fixed and movable members, transversely coextensive with the movable member, said second constraint device being permanently fastened between said second and intermediate members for preventing relative rotation therebetween, but permitting substantial relative axial and tilting movements between said second and intermediate members while said element and surface of the first constraint device remain engaged.

21. A touch probe for position determining apparatus, comprising:

a fixed member having an axis;

a movable member for carrying a workpiece-contacting stylus;

a spring biasing the movable member into a rest position relative to the fixed member, the movable member being movable out of the rest position against the action of the spring when a force is applied to the stylus;

a detector for providing a signal when said stylus contacts a workpiece; and a constraint mechanism between the fixed and movable members for constraining movement of the movable member when it is biased into the rest position; the constraint mechanism including:

an intermediate member which is movable relative to the fixed and movable members;

a first constraint device between the intermediate member and a first one of the fixed and movable members, comprising at least one element on one of said first and intermediate members which is engageable with at least one corresponding surface on the other one of said first and intermediate members, thereby to constrain relative movements between said first and intermediate members when said element and surface are engaged, said first and intermediate members being relatively rotatable upon application of sufficient force to the movable member; and a second constraint device between the intermediate member and a second one of the fixed and movable members, located entirely within the transverse extent of the movable member, said second constraint device being permanently fastened between said second and intermediate members for preventing relative rotation therebetween, but permitting substantial relative axial and tilting movements between said second and intermediate members while said element and surface of the first constraint device remain engaged.

22. A touch probe for position determining apparatus, comprising:

a fixed member having an axis;

a movable member for carrying a workpiece-contacting stylus;

a spring biasing the movable member into a rest position relative to the fixed member, the movable member being movable out of the rest position against the action of the spring when a force is applied to the stylus;

a pair of axially confronting annular surfaces, one on the fixed member and one on the movable member, the annular surfaces extending around the axis and being engageable tiltably so as to permit tilting of the movable member when the stylus contacts a workpiece;

a lateral constraint including at least one support element on one of the fixed and movable members and a seat on the other one of the fixed and movable members, the seat having at least one surface which is inclined to the axis and the support element being axially biased by the spring into the seat in contact with said inclined surface, to provide lateral constraint of the movable member in all directions perpendicular to the axis, the lateral constraint permitting tilting of the movable member with the support element still seated in the seat, thereby providing said lateral constraint in all directions simultaneously with the tilting; and a detector for detecting deflection of the movable member out of the rest position.

23. A touch probe according to claim 22, wherein the support element remains engaged in the seat during the commencement of said tilting, thereby providing said lateral constraint during the commencement of tilting, and wherein the support element disengages from the seat as further tilting occurs.

24. A touch probe according to claim 22, wherein said axially confronting annular surfaces comprise an edge of a depending skirt on the movable member, and a flat surface on the fixed member opposing said edge.

25. A touch probe for position determining apparatus, comprising:

a fixed member having an axis;

a movable member for carrying a workpiece-contacting stylus;

a spring biasing the movable member into a rest position relative to the fixed member, the movable member being movable out of the rest position against the action of the spring when a force is applied to the stylus;

a skirt defining a first annular surface on one of said fixed and movable members, and a flat annular surface on the other of said fixed and movable members, the annular surfaces axially confronting each other and extending around the axis and being engageable tiltably so as to permit tilting of the movable member when the stylus contacts a workpiece;

a lateral constraint including at least one support element on one of the fixed and movable members and a seat on the other one of the fixed and movable members, the seat having at least one surface which is inclined to the axis and the support element being axially biased by the spring into the seat in contact with said inclined surface, to provide lateral constraint of the movable member in all directions perpendicular to the axis, the lateral constraint permitting tilting of the movable member with the support element still seated in the seat, thereby providing said lateral constraint in all directions simultaneously with the tilting; and a detector for detecting deflection of the movable member out of the rest position.

26. A touch probe according to claim 25, wherein the support element remains engaged in the seat during the commencement of said tilting, thereby providing said lateral constraint during the commencement of tilting, and wherein the support element disengages from the seat as further tilting occurs.

27. A touch probe for position determining apparatus, comprising:

a fixed member having an axis and an upwardly facing flat annular surface;

a movable member for carrying a workpiece-contacting stylus, and having a skirt with a lower edge defining an annular surface;

the annular surfaces axially confronting each other and extending around the axis and being engageable tiltably so as to permit tilting of the movable member when the stylus contacts a workpiece;

a spring biasing the movable member into a rest position relative to the fixed member, the movable member being movable out of the rest position against the action of the spring when a force is applied to the stylus;

a lateral constraint including at least one support element on one of the fixed and movable members and a seat on the other one of the fixed and movable members, the seat having at least one surface which is inclined to the axis and the support element being axially biased by the spring into the seat in contact with said inclined surface, to provide lateral constraint of the movable member in all directions perpendicular to the axis, the lateral constraint permitting tilting of the movable member with the support element still seated in the seat, thereby providing said lateral constraint in all directions simultaneously with the tilting; and a detector for detecting deflection of the movable member out of the rest position.

28. A touch probe according to claim 27, wherein the support element remains engaged in the seat during the commencement of said tilting, thereby providing said lateral constraint during the commencement of tilting, and wherein the support element disengages from the seat as further tilting occurs.

29. A touch probe for position determining apparatus, said touch probe having an axis and comprising:

a fixed member;

a first movable member for carrying a workpiece-contacting stylus;

first support means comprising a planar spring and at least one pair of first elements which are mutually engageable in the axial direction; and second support means, independent from the first support means and comprising at least one pair of second elements which are mutually engageable; the first and second support means cooperating with each other when all said elements are engaged to hold the first movable member in a rest position relative to the fixed member, the planar spring providing a lateral constraint while permitting axial displacement of the first movable member when said first elements disengage;

first and second bias means for biasing all said elements into engagement; both said first and second pairs of elements being disengageable in the same direction against the action of the first and second bias means to permit displacement of the first movable member relative to the fixed member out of said rest position when said stylus contacts a workpiece;

said pair of first elements being biased into engagement with a lower force than said pair of second elements, whereby upon displacement of the first movable member said pair of first elements disengages against said lower bias force, with flexure of the planar spring, and then subsequently said pair of second elements disengages, thereby limiting said flexure of the planar spring; and means for providing a signal when said stylus contacts a workpiece.

30. A touch probe according to claim 29, wherein the first support means includes abutment means for restricting movement of said first elements away from each other when said first elements disengage.

31. A touch probe according to claim 25, wherein said second elements form a kinematic support.

32. A touch probe according to claim 29, wherein said first support means provides an axial constraint for the first movable member, said first elements being located on the first movable member and on the fixed member respectively.

33. A touch probe according to claim 29, wherein said pair of first elements comprises an annulus on one of said fixed and first movable members and a flat surface on the other of said fixed and first movable members.

34. A touch probe according to claim 29, wherein said first support means comprises three of said first elements on one of said fixed and first movable members, engageable with three locations on the other of said fixed and first movable members.

35. A touch probe according to claim 29, including a second movable member, one of said support means being provided between the first and second movable members, the other of said support means being provided between the second movable member and the fixed member.

36. A touch probe according to claim 35, wherein said first support means is provided between the second movable member and the fixed member, and said second support means is provided between the first and second movable members.

37. A touch probe according to claim 35, wherein said first support means is provided between the first and second movable members, and said second support means is provided between the second movable member and the fixed member.

38. A touch probe for position determining apparatus, comprising:

a fixed member having an axis;

a movable member for carrying a workpiece-contacting stylus;

bias means for biasing the movable member into a rest position relative to the fixed member, the movable member being movable out of the rest position against the action of the bias means when a force is applied to the stylus;

a detector for providing a signal when said stylus contacts a workpiece; and a constraining device between the fixed and movable members for constraining movement of the movable member when it is biased into the rest position; the constraining device including:

an axial constraint for constraining the movable member axially relative to the fixed member when it is biased into the rest position;

a planar spring for preventing rotation of the movable member relative to the fixed member;

an intermediate member which is movable relative to the fixed and movable members;

support means additional to the axial constraint, the support means being provided between the intermediate member and a first one of the fixed and movable members, and comprising elements on one of said first and intermediate members which are engageable with corresponding surfaces on the other one of said first and intermediate members, thereby to constrain movement of the intermediate member relative to the first member when said elements and surfaces are engaged, the first and intermediate members being relatively rotatable when said elements and surfaces are disengaged;

and in that said planar spring is provided between the intermediate member and the other one of the fixed and movable members, for preventing relative rotation therebetween, but permitting axial and tilting movements therebetween while said elements and surfaces of the support means remain engaged.

39. A touch probe according to claim 38, wherein said support means is provided between the intermediate member and the fixed member, and said planar spring is provided between the intermediate member and the movable member.

40. A touch probe according to claim 38, including a device for limiting rotation of the movable member relative to the fixed member when said elements and surfaces of the support means are disengaged to permit rotation, the rotation limiting device comprising elements on the fixed and movable members respectively which are normally separated by a clearance but which engage with each other after limited relative rotation.

41. A touch probe according to claim 40, wherein said elements of the rotation limiting device comprise a dowel connected to one of the fixed and movable members and a hole on the other of said fixed and movable members, the dowel being located in the hole with said clearance.

42. A touch probe according to claim 38, wherein the support means forms a kinematic support.

43. A touch probe according to claim 42, wherein said engageable elements and surfaces of the kinematic support take the form of three elements on said one of said first and intermediate members, engageable with respective pairs of mutually convergent surfaces on the other one of said first and intermediate members.

44. A touch probe according to claim 38, wherein said axial constraint includes a pair of axially confronting surfaces, one on the fixed member and one on the movable member, which are engageable tiltably so as to permit tilting of the movable member away from the rest position when the stylus engages the workpiece.

45. A touch probe according to claim 44, wherein said axially confronting surfaces are disposed annularly around said axis.

46. A touch probe according to claim 45, wherein said axially confronting surfaces comprise a lower edge of a depending skirt on the movable member, and an upwardly facing flat surface on the fixed member.

47. A touch probe for position determining apparatus, comprising:
a fixed housing member having an axis;
a movable member for carrying a workpiece-contacting stylus;
bias means for biasing the movable member into a rest position relative to the fixed member, the movable member being movable out of the rest position against the action of the bias means when a force is applied to the stylus;
a pair of axially confronting annular surfaces, one on the fixed member and one on the movable member, the annular surfaces extending around the axis and being engageable tiltably so as to permit tilting of the movable member when the stylus contacts a workpiece;
a lateral constraint, separate from said ananular surfaces, and including at least one support element on one of the fixed and movable members and a seat on the other one of the fixed and movable members, the seat having at least one surface which is inclined to the axis and the support element being axially biased by the bias means into the seat in contact with said inclined surface, to provide lateral constraint of said annular surface of the movable member in all directions perpendicular to the axis, the lateral constraint permitting tilting of the movable member with the support element still seated in the seat, thereby providing said lateral constraint in all directions simultaneously with the tilting; and
a detector for detecting deflection of the movable member out of the rest position.

48. A touch probe according to claim 47, wherein the support element remains engaged in the seat during the commencement of said tilting, thereby providing said lateral constraint during the commencement of tilting, and wherein the support element disengages from the seat as further tilting occurs.

49. A touch probe according to claim 47, wherein said axially confronting annular surfaces comprise a skirt on the movable member, and a flat surface on the fixed member.

50. A touch probe according to claim 47, wherein the lateral constraint includes a planar spring.

51. A touch probe for position determining apparatus, comprising:
a fixed housing member having an axis;
a movable member for carrying a workpiece-contacting stylus;
bias means for biasing the movable member into a rest position relative to the fixed member, the movable member being movable out of the rest position against the action of the bias means when a force is applied to the stylus;
an axially projecting skirt defining a first annular surface on one of said fixed and movable members, and a second annular surface on the other of said fixed and movable members, the annular surfaces axially confronting each other and extending around the axis and being engageable so as to permit tilting of the movable member when the stylus contacts a workpiece;
a lateral constraining device, including at least one support element on one of the fixed and movable members, and at least one surface on the other one of the fixed and movable members, which surface is inclined to the axis, the support element being axially biased by the bias means into contact with said inclined surface, thereby providing lateral constraint when in contact; said support element and inclined surface being distinct from said skirt and second annular surface and being located closer to said axis than said skirt; and
means for detecting deflection of the movable member out of the rest position.

52. A touch probe according to claim 51, wherein the support element remains in contact with said inclined surface during the commencement of said tilting, thereby providing lateral constraint during the commencement of tilting, and wherein the support element disengages from the inclined surface as further tilting occurs.

53. A touch probe according to claim 51, wherein said skirt is on the movable member and said second annular surface is on the fixed member.

54. A touch probe according to claim 53, wherein said skirt depends from the movable member and has said first annular surface at a lower edge thereof; and said second annular surface faces upwardly.

55. A touch probe according to claim 51, further including a planar spring for constraining movement of the movable member relative to the fixed member.

* * * * *